H. M. WALTER.
HOBBY HORSE.
APPLICATION FILED SEPT. 18, 1913.
1,198,386.
Patented Sept. 12, 1916.
2 SHEETS—SHEET 1.
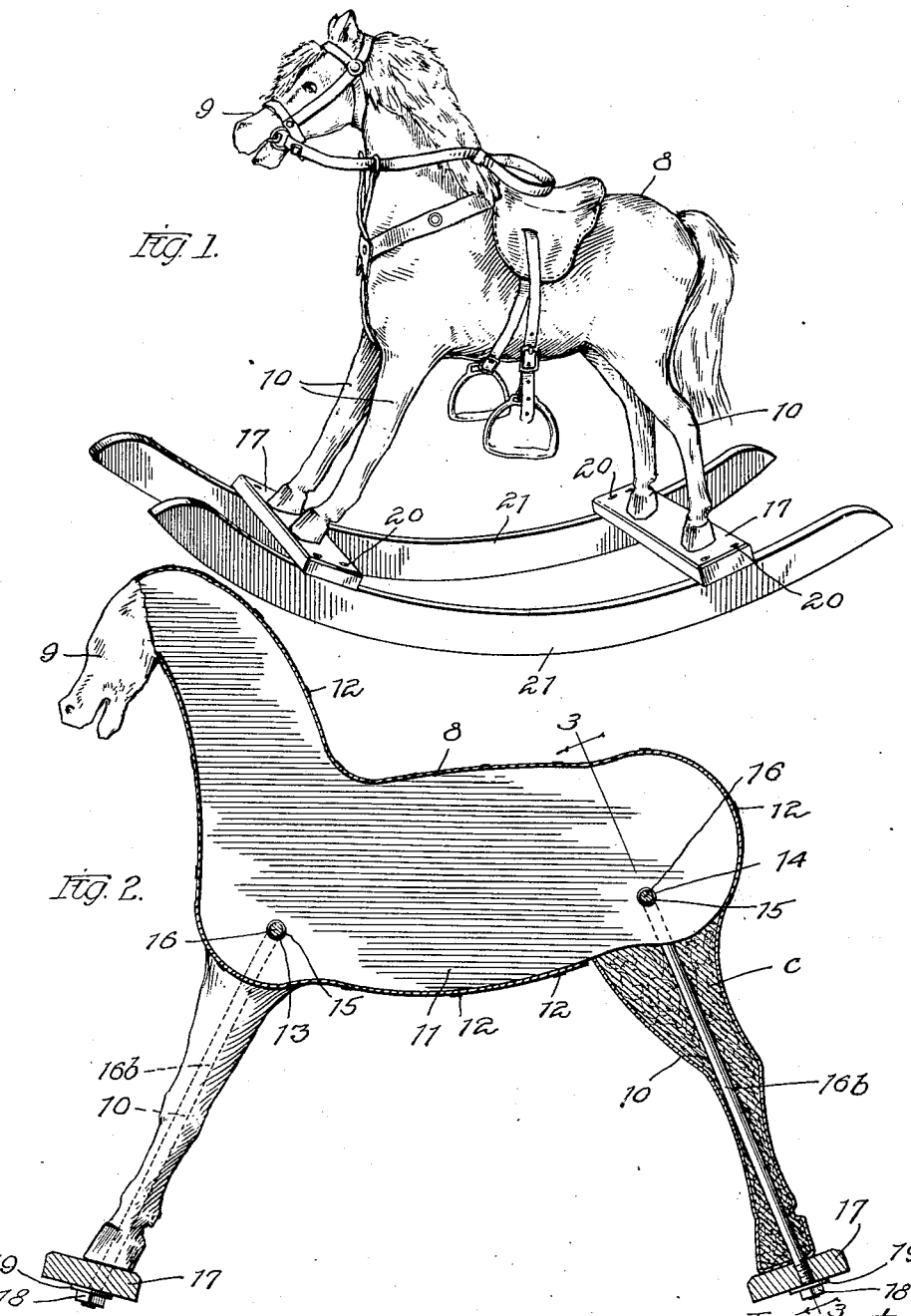
Witnesses:
Robert F. Weir
Arthur W. Carlson
Inventor
Henry M. Walter
By: Brown, Williams, Bell, Hanson & Boettcher
Attys.

H. M. WALTER.
HOBBY HORSE.
APPLICATION FILED SEPT. 18, 1913.
1,198,386.
Patented Sept. 12, 1916.
2 SHEETS—SHEET 2.
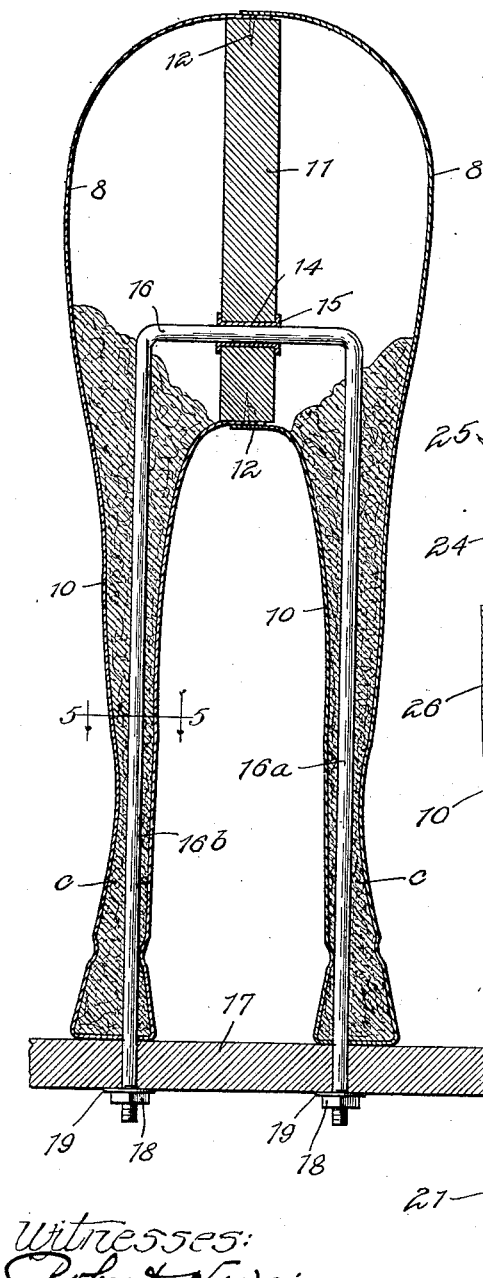
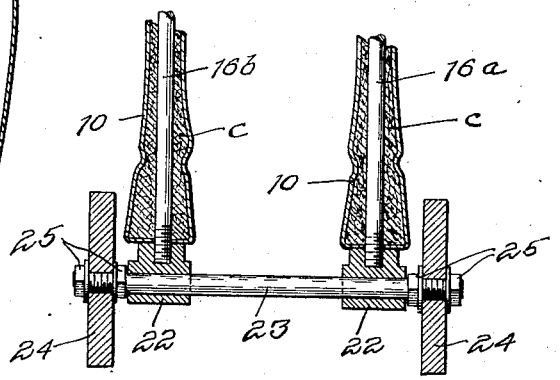
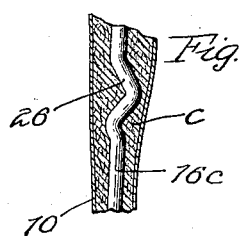
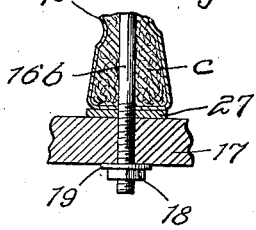
Witnesses:
Robert H. Weir
Arthur W. Carton
Inventor
Henry M. Walter
By Brown, Williams, Bell, Hanson & Boettcher
Attys.

UNITED STATES PATENT OFFICE.

HENRY M. WALTER, OF MILWAUKEE, WISCONSIN, ASSIGNOR, BY MESNE ASSIGNMENTS, TO MILWAUKEE HOBBY HORSE CO., OF MILWAUKEE, WISCONSIN, A CORPORATION OF WISCONSIN.

HOBBY-HORSE.

1,198,386.  Specification of Letters Patent.  Patented Sept. 12, 1916.

Application filed September 18, 1913. Serial No. 790,398.

*To all whom it may concern:*

Be it known that I, HENRY M. WALTER, a citizen of Switzerland, residing at Milwaukee, in the county of Milwaukee and State of Wisconsin, United States of America, have invented a certain new and useful Improvement in Hobby-Horses, of which the following is a full, clear, concise, and exact description, reference being had to the accompanying drawings, forming a part of this specification.

My invention relates to toys for children and is particularly concerned with animal forms or figures, such as hobby horses and rocking horses, which are adapted to be ridden by the children and are therefore required to be of more than mere self-sustaining sturdiness.

My invention has to do with the construction of the figure and its immediately related parts and comprises various features such as the structural relation of the various members, the compositions of matter employed, the more or less specific construction of the legs, combinations of these elements, and the process of manufacture.

While it will appear evident that the figure of any animal may be simulated, I contemplate particularly that of a horse and to simplify the disclosure of my invention I shall call it a hobby horse and shall limit my specific description to the forms shown in the drawings in order to instruct those skilled in the art in the use of my invention.

The four prime qualities which I seek to attain are strength, lightness, simplicity and naturalness of appearance. The features of my invention lie in the means for securing strength without sacrificing lightness, and lightness without sacrificing strength, and keeping both these qualities consistent with simplicity and naturalness of appearance.

To the ends thus pointed out, I make the form of the horse hollow and out of such material as papier mâché, this hollow form being made by any recognized method of producing papier mâché figures. Within this form I mount a skeleton supporting structure which gives the form sufficient sturdiness for a child to sit upon and ride the horse, the form being mounted upon rockers or rollers, as desired. The more or less specific structure of the skeleton is of great importance.

The legs of the figure are filled with a composition which results in the provision of a strong support reinforced by parts of the skeleton already referred to.

As a further feature of my invention, I securely connect the supporting means and the base, and a hobby horse of natural appearance, minus the unattractive external bracing means of the prior art devices, is the result.

In the accompanying drawings, I have illustrated a specific embodiment of my invention, together with certain modifications.

In these drawings, Figure 1 is a complete perspective view of the hobby horse; Fig. 2 is a longitudinal sectional view thereof, the plane of section being substantially central, but being displaced at one of the legs to show the interior thereof, and certain parts being removed for the sake of simplicity; Fig. 3 is a cross-sectional view taken on the plane of the line 3—3 of Fig. 2; Fig. 4 is a fragmentary view similar to the lower part of Fig. 3 except that a modified form of support is illustrated; Fig. 5 is a cross-sectional view taken on the plane of the line 5—5 of Fig. 3; and Figs. 6 and 7 are fragmentary views illustrating modifications which will be referred to.

The figure itself is hollow, is made of papier mâché, or some similar material, and comprises a body 8, a head 9, and legs 10, 10. This papier mâché body is made by means of any of the well-known methods of making papier mâché figures and in this instance it is well to make the body in two parts, which are joined together in the longitudinal central plane, as will be pointed out presently. Each of these two parts carries a front leg and a rear leg and one of these parts carries the fore part of the head.

The papier mâché figure is constructed in a mold of the type which can be built-up part by part and dismantled part by part, and, in the process of making the figure, one-half of the body, the head and one-half of a front leg and one-half of a hind leg are made in an integral part by the successive applications of layers of paper and of paste.

When so much of the figure has been completed, the leg halves are filled with a composition which will be referred to specifically later, and a center-board 11, which is cut to conform to the central longitudinal contour of the horse's body, is disposed in place in the nature of a closure for the hollow body part which has just been described, as illustrated in Fig. 2. The papier mâché walls are then preferably secured to the center-board 11, by means of tacks 12, 12, as illustrated in Fig. 3. Toward the front of the center-board 11, an opening 13 is provided and, toward the rear, an opening 14 is provided, each of these openings being provided with a ferrule 15 of metal. An inverted U-shaped rod 16 is hung in each of the ferrules 15, the rods preferably fitting tightly in the ferrules and the ferrules being provided for the purpose of saving wear upon the wood of which the center-board 11 is preferably constructed. Each of the downwardly extending limbs of each of the U-shaped rods forms a reinforcing or bracing member for one of the legs and, when the board 11 has been put in place as just described, these U-shaped rods are carried by the board and one limb of each of the rods rests in the composition in the leg halves, as illustrated in the case of the hind leg in Fig. 2. When the manufacturing process has reached this stage, the other leg halves, which have been properly filled with the composition, are applied, and the two halves are joined by the application of more layers of paper and paste. The leg then assumes the appearance of the fore leg in Fig. 2. As illustrated, the U-shaped rods are extended beyond the ends of the legs, that is, beyond the hoofs, for a purpose which will be described presently.

The first stage of the other half of the horse is constructed independently—that is, the stage wherein one-half of the body and half of each of the legs for that side of the body are formed. When the papier mâché of both halves of the figure has dried out sufficiently, the half which has been last described is applied to the half which was first described, it being understood that in this step of the process the free limbs of the rods 16, 16 are embedded in the composition in the leg halves of the second part of the figure. The two body parts are preferably secured together by the use of more tacks 12, as illustrated in Fig. 3, and the remaining leg halves are secured to the leg halves of the second body part in the same manner as in the case of the legs of the first body part.

The result is the complete figure with the two body parts made independently integral in papier mâché, but secured together by their common attachment to the center-board. This complete figure which has been described also includes the composition filling in each of the legs and the reinforcing members secured to the centerboard and extending through the legs. This arrangement is well illustrated in Fig. 3, where it will be seen that the downwardly extending limbs 16ª and 16ᵇ pass through the respective legs and extend beyond the hoofs and through a base-board 17, which will be referred to later.

The composition with which the legs are filled is a composition of fiber and paste and, when the moisture of this composition has become dried out, the result is a firm sustaining mass which not only prevents collapse of the legs under ordinary circumstances, but supports the body with sufficient sturdiness so that a child may sit upon and ride the horse. The composition, which I designate by "$c$", is firmly packed into the legs and the reinforcing rods 16ª and 16ᵇ, etc., are firmly embedded in this composition.

The fiber of the composition is preferably cotton fiber and the paste is preferably formed of a compound of wheat flour, alum, lime, sugar, and water, the sugar being relatively unimportant in this combination. In order that those skilled in the art may be instructed in the use of this feature of my invention, I give the following proportions as exemplary: Three pounds of flour, one-quarter ounce of powdered alum, a pound of lime, half a pound of sugar, and sufficient water to make a pasty mass. This amount of paste is mixed with two pounds of cotton fiber to make the ultimate filler composition and, as before pointed out, in the drying process, the water is evaporated to leave the hardened sustaining mass. This paste which in combination with the fiber makes the filler for the legs, may also be used as the paste for the papier mâché process and as such it is an extremely efficient paste, not only as to its adhesive qualities, but also as to its lasting and sanitary qualities, since it does not sour, or attract flies, or have an odor.

The reinforcing rods 16ª and 16ᵇ extend through the cross-boards 17, 17 and are screw-threaded for the reception of nuts 18, 18, which clamp tightly against washers 19, 19, on the under side of the boards. These boards are secured by means of screws 20, 20 to the rockers 21, 21, as illustrated in Figs. 1 and 3, and it will now be seen that the base, which may be either a rocker base or a stationary or roller base, directly supports the body of the horse, upon which the child is to sit, through the U-shaped reinforcing rods, or supporting rods, the center-board, and the filler in the legs, the latter serving also to keep the walls of the body properly distended and supported against collapse, as is evident from Fig. 3.

In Fig. 4, I have illustrated a modified form of support with which the U-shaped rods 16 may be associated. In the case of this modification T-joints 22, 22 have their stems screwed tightly upon the ends of the rods and have their cross-pieces disposed in alinement for the common reception of a cross-rod 23, which may be secured to rockers 24, 24, or other side supporting pieces by means of clamping devices 25, 25.

In Fig. 6, I have illustrated a modified form of supporting bar $16^c$. This bar is deformed or crimped as illustrated at 26, so as to insure its firm and definite lodging in the filler "c" for the leg 10.

In Fig. 7, I have illustrated a modification wherein the rod $16^b$, for instance, is clamped to the board 17, not only by means of the clamping nut 18, but also by means of a clamping nut 27 on the upper side of the board, thus determining, at the board itself, the rigid and definite relation of the supporting or reinforcing rods to the base members.

The papier mâché body may be painted or covered by canvas or hide and a suitable forelock, mane, and tail may be provided. It is usual also to provide a saddle with stirrups and the usual riding harness, these features, however, being merely a matter of design.

It will be seen that the hobby horse is not burdened with unsightly external bracing devices, but that, on the contrary, a figure of natural and attractive appearance is obtained.

The hobby horse is light so that it can be moved about from place to place by a child and, notwithstanding this lightness of construction, the structure is mechanically resistant and of more than sufficient sturdiness for riding purposes.

I claim as new and desire to secure by Letters Patent:

1. In a device of the class described, a hollow body of papier mâché, a longitudinal center-board within said body, hollow papier mâché legs extending from said body, a solid filling for said legs, and reinforcing rods passing through said legs and connected with said center-board.

2. In a device of the class described, a hollow structure including a body, head and legs of papier mâché, and a solid filling in said legs.

3. In a device of the class described, a hollow structure including a body, head and legs of papier mâché, a vertical longitudinal center-board in said body, and a solid filling in said legs.

4. In a device of the class described, a hollow structure including a body, head and legs of papier mâché, a vertical longitudinal center-board in said body, said body being secured to said center-board, and a solid filling in said legs.

5. In a device of the class described, a hollow body of papier mâché, a longitudinal center-board within said body, hollow papier mâché legs extending from said body, and reinforcing rods passing through said legs and connected with said center-board.

6. In a device of the class described, a hollow body of papier mâché, a longitudinal center-board within said body, hollow papier mâché legs extending from said body, a solid filling for said legs, and U-shaped reinforcing rods passing through said legs and connected with said center-board.

7. In a device of the class described, a hollow body of papier mâché, a longitudinal center-board within said body, hollow papier mâché legs extending from said body, and U-shaped reinforcing rods passing through said legs and connected with said center-board.

8. In a device of the class described, a hollow body of papier mâché, a longitudinal center-board within said body, hollow papier mâché legs extending from said body, a base member, and reinforcing rods passing through said legs and connected with said center-board and with said base member.

9. The process of manufacturing toy horses which consists in making a hollow body, head and legs of papier mâché, filling the legs with a pasty substance, and then drying out the water to leave a hardened sustaining mass.

10. The process of manufacturing toy horses which consists in making a hollow body, head and legs of papier mâché, filling the legs with a pasty substance including fiber, and then drying out the water to leave a hardened sustaining mass.

11. In a device of the class described, a body and legs extending therefrom, a base-board, a longitudinal center-board in the body, and bracing rods extending through the legs and through the center-board and extending beyond them and through the base-board, and clamping nuts on the opposite side of the base-board engaging the ends of said rods.

12. In a device of the class described, a body and legs extending therefrom, a base-board, a longitudinal center-board in the body, and U-shaped bracing rods extending through the legs and through the center-board and extending beyond them and through the base-board, and clamping nuts on the opposite side of the base-board engaging the ends of said rods.

13. In a device of the class described, a hollow body of papier mâché, a longitudinal center-board within said body, hollow papier mâché legs extending from said body, a solid filling for said legs, and deformed reinforcing rods passing through said legs and connected with said center-board.

14. In a device of the class described, a papier mâché body and legs extending therefrom, a base-board, a solid filling in said legs, and deformed reinforcing rods within said legs and secured to the base-board.

15. In a device of the class described, a papier mâché body and legs extending therefrom, a base-board, a solid filling in said legs, a center-board in said body, and deformed reinforcing rods within said legs and secured to the base-board and to said center-board.

16. In an animal figure a base, a rigid frame member extending longitudinally substantially the full length of the trunk of the animal figure, a plurality of rods connecting said frame member with said base, a relatively thin shell formed to simulate the animal, said shell surrounding said frame member and said rods, said rods being surrounded by the leg portions of the figure, and rigid filling means between the leg portions of the shell and said rods.

17. In an animal figure, a base member, a rigid frame member extending longitudinally of the trunk of the figure, a plurality of rigid members connecting said frame member, with said base member, said rigid members corresponding to the supporting legs of the animal, a relatively thin shell formed to simulate an animal surrounding said frame member and said rigid members, the trunk portion of said shell being secured to said longitudinal frame member, the leg portions of the shell surrounding said rigid members and rigid filling means between said portions of the shell and said rigid members.

In witness whereof, I hereunto subscribe my name this 15th day of September, A. D. 1913.

HENRY M. WALTER.

Witnesses:
 HANS MAISON,
 GEORGE W. HAMMERSCHLAG.

Copies of this patent may be obtained for five cents each, by addressing the "Commissioner of Patents, Washington, D. C."